May 29, 1956  W. E. ERICKSON  2,747,769
SEAL STRIPPING AND OPENING DEVICE
Filed Feb. 9, 1952  4 Sheets-Sheet 1

INVENTOR.
Warren E. Erickson
BY
Andrus & Sceales
ATTORNEYS.

May 29, 1956 W. E. ERICKSON 2,747,769
SEAL STRIPPING AND OPENING DEVICE
Filed Feb. 9, 1952 4 Sheets-Sheet 2
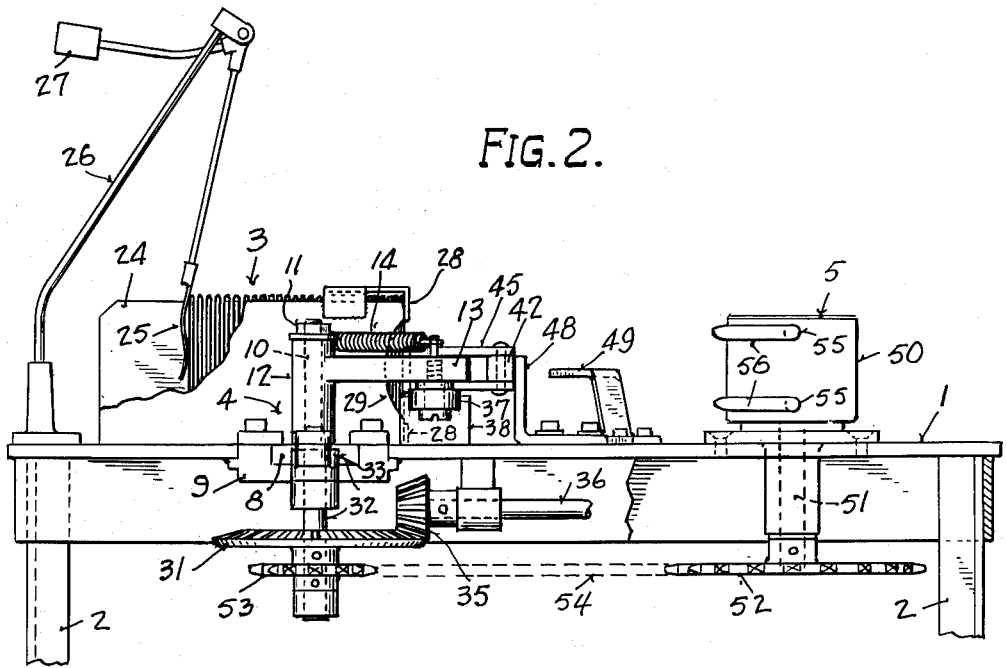
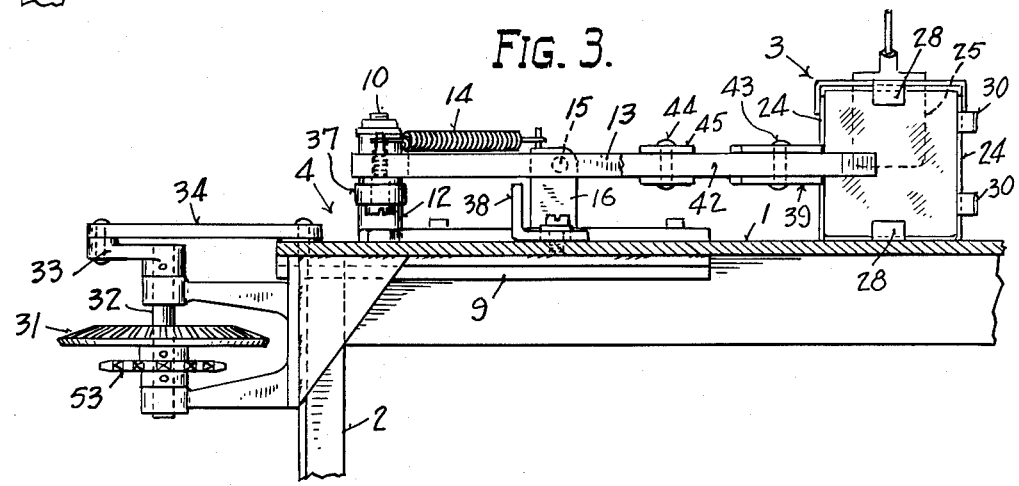
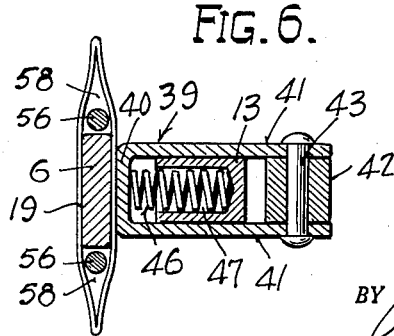
INVENTOR.
Warren E. Erickson
BY
ATTORNEYS.

May 29, 1956    W. E. ERICKSON    2,747,769
SEAL STRIPPING AND OPENING DEVICE
Filed Feb. 9, 1952    4 Sheets-Sheet 3
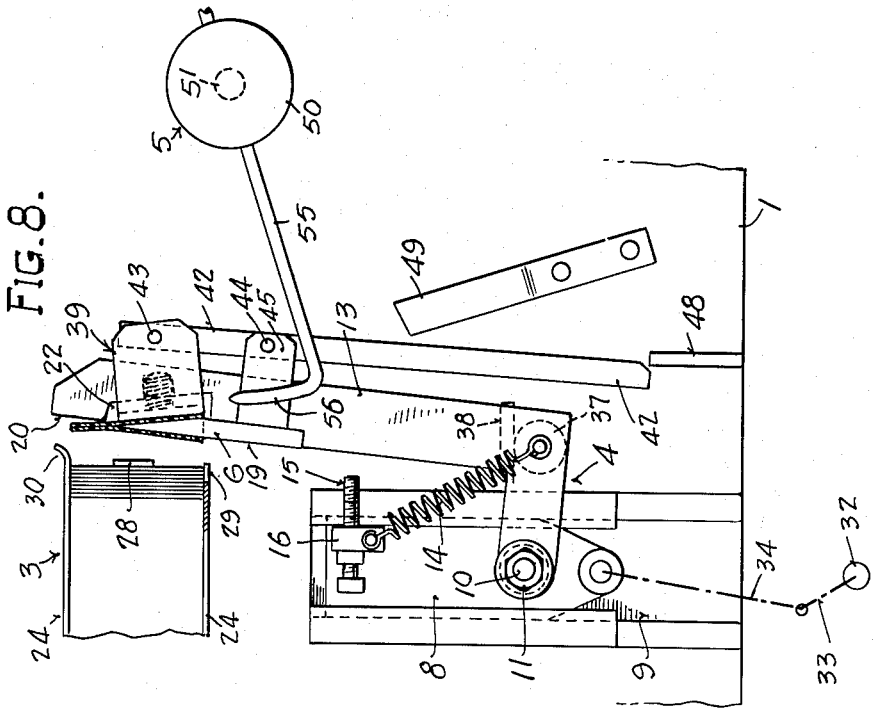
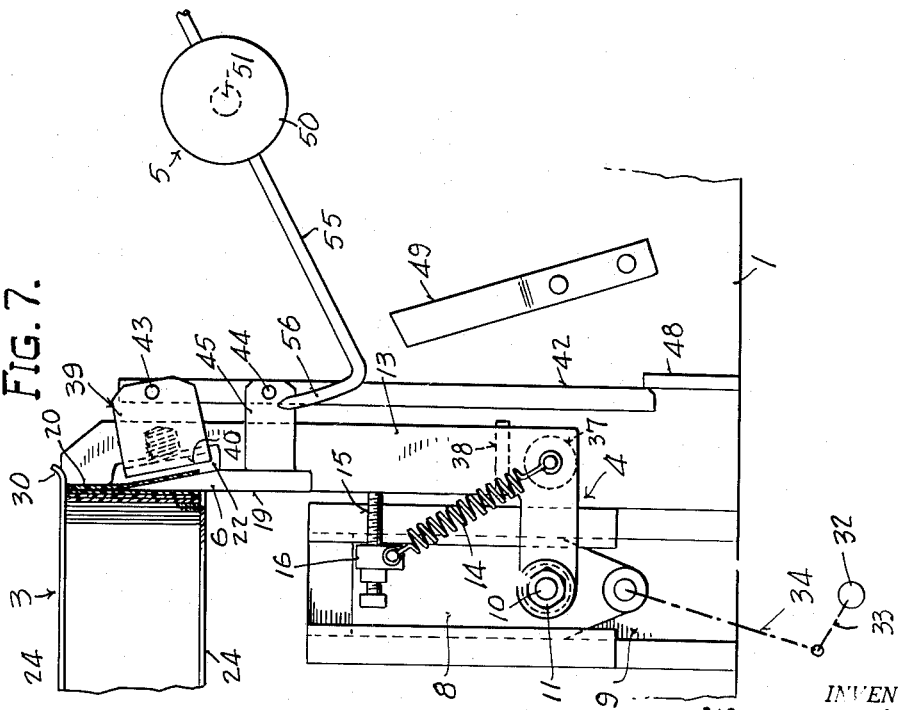
INVENTOR.
Warren E. Erickson
BY
Andrus & Sceales
ATTORNEYS.

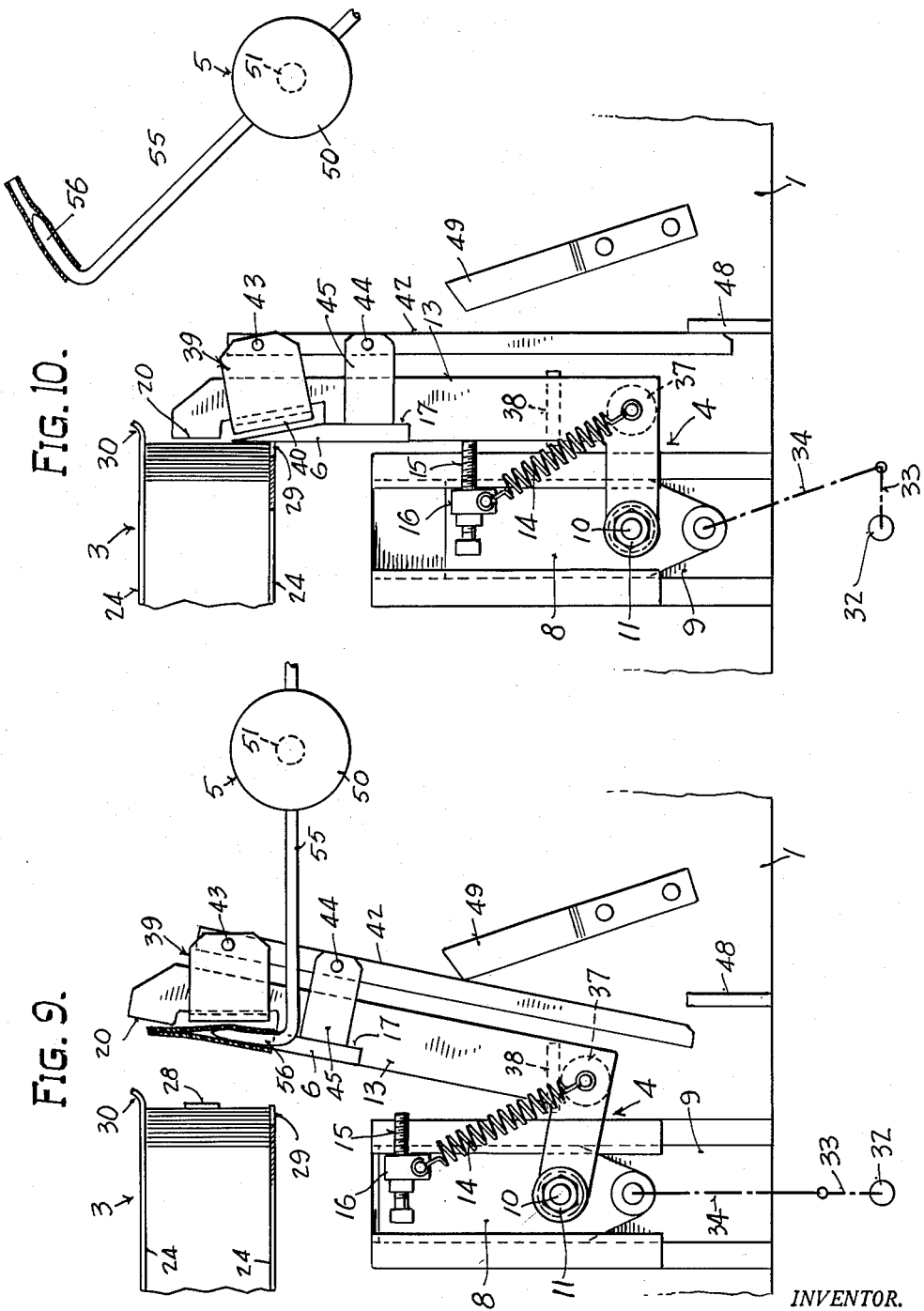

United States Patent Office 2,747,769
Patented May 29, 1956

2,747,769

SEAL STRIPPING AND OPENING DEVICE

Warren E. Erickson, Madison, Wis., assignor to Gisholt Machine Company, Madison, Wis., a corporation of Wisconsin Application February 9, 1952, Serial No. 270,838

11 Claims. (Cl. 221—225)

This invention relates to seal stripping opening devices of the type employed in machinery for automatically applying tubular shrink fit regenerated cellulose seals to bottles and the like.

One of the principal objects of the invention is to provide for partial opening of a seal at the same moment that the seal is stripped from its supply magazine, whereby the overall time required to apply a seal to a bottle is substantially reduced.

A further object is to provide a single implement capable of both stripping a seal from a magazine and effecting partial opening of the seal.

A further object is to provide a stripping and opening implement which can perform both functions with but a single motion.

Another object of the invention is to provide for the stripping and opening of a seal by an implement or tool moving laterally of the seal magazine, whereby seals other than that most forwardly disposed may be more effectively retained in the magazine.

A further object is to provide a seal stripping mechanism wherein the stripping tool may be more accurately aligned with the forward seal in a supply magazine whereby succeeding seals in the magazine are less disturbed by the stripping action.

A further object is to provide a means for stripping seals from a supply magazine where selection of angular disposition of the magazine is not limited.

Another object of the invention is to provide a means for partial opening of seals while disposed upright in a magazine thereby eliminating the need for a special support or backing for the seal at the time of opening.

Another object is to provide an implement for stripping and partially opening seals which further may serve to carry the seal from the magazine.

A further object is to provide for partial opening of a seal by an implement that enters the seal whereby seal distortion in opening occurs in natural stages toward the final cylindrical form.

A further object is to reduce the complexity and size of machines for applying sealing bands by combining stripping, partial opening, and transfer function in a single implement or tool and by having partial opening occur prior to stripping the seal from the supply magazine.

The stripping and opening tool of the present invention comprises a spear-like tool which moves transversely of the seal magazine entering the forward seal at one end of the magazine and thereafter carrying the seal away from the magazine to strip the same. The spear enters the seal centrally of its closed edges leaving spaces between the spear and each closed edge for the subsequent entry of a pair of transfer fingers which straddle the spear to remove the partially opened seal therefrom.

Other objects and advantages of the invention will appear in the following description of an embodiment of the invention illustrated in the accompanying drawings.

In the drawings:

Fig. 2 is an end elevational view of the structure shown in Fig. 1;

Fig. 3 is a side elevation view, partly in section, of the structure shown in Fig. 1;

Fig. 6 is a detail sectional view of the spear carrying a seal clamped thereon;

Fig. 7 is a partly diagrammatic detail plan view showing the spear as it initially enters the seal, the clamping mechanism remaining in unclamped position;

Fig. 8 is a view similar to Fig. 7 but showing the spear after fully entering the seal and having carried the seal in clamped position outwardly from the magazine;

Fig. 9 is a view similar to Fig. 8 but showing the transfer fingers after having entered the seal and with the seal once again unclamped; and Fig. 10 is a view similar to Fig. 9 but showing the seal supported on the transfer fingers with the spear withdrawing from the magazine.

Figure 1:
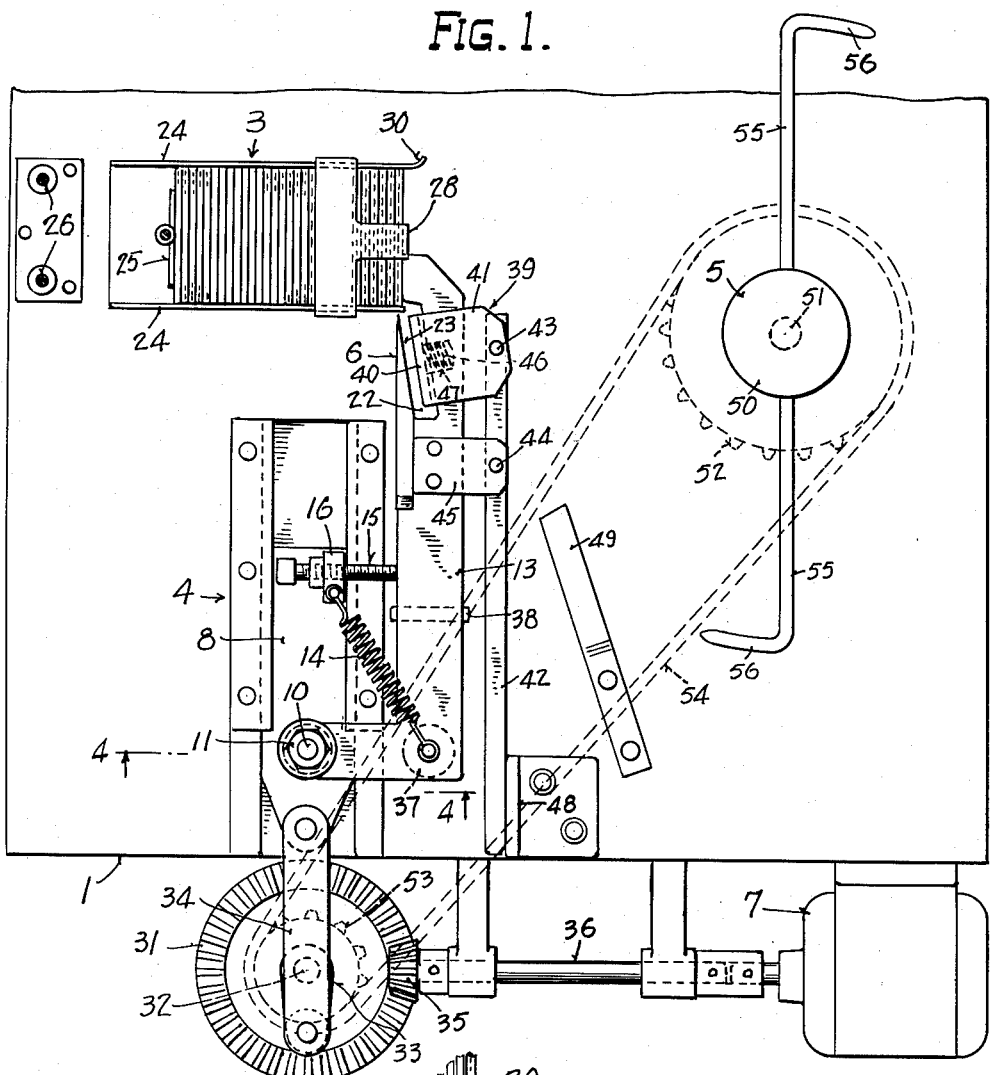
Figure 1 is a top plan view of mechanism for stripping, partially opening, and transferring a sealing band from a supply magazine.

The machine comprises, in general, a table 1 elevated by legs 2, a seal supply magazine 3 fixed upon table 1, a slide assembly 4 supported for reciprocal movement on table 1, and a seal transfer mechanism 5 rotatably supported on table 1. A spear-like tool 6 carried by slide assembly 4 both strips and partially opens seals disposed in magazine 3, as will be described. A motor 7 is connected to drive both the slide 4 and transfer mechanism 5.

Figure 4:
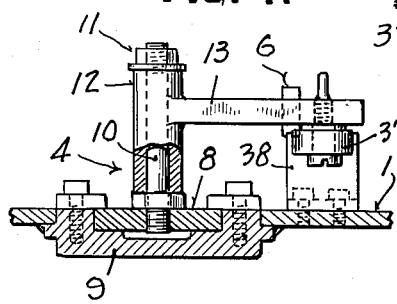
Fig. 4 is a detail sectional view taken on line 4—4 of Fig. 1.

Slide assembly 4 comprises a slide plate 8 mounted for reciprocal movement on ways 9 disposed on the underside of table 1, as shown in Fig. 4. The plate 8 carries an upwardly extending pivot bolt 10 threaded to receive a nut 11 at its upper end. Between plate 8 and nut 11, the bolt 10 pivotally supports a sleeve 12 which in turn rigidly supports an L-shaped arm 13. The arm 13 is normally disposed parallel to the ways 9, being biased by a spring 14 against a stop screw 15. The stop screw 15 is carried by the slide plate 8 on an upwardly extending post 16.

Figure 5:
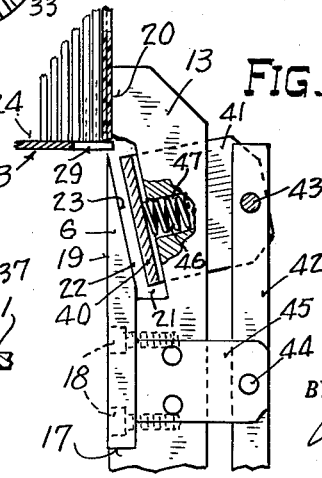
Fig. 5 is a detail sectional view of the spear and associated clamping mechanism.

Referring to Fig. 5, the forward end of arm 13 has its inside surface nearest the ways 9 recessed at 17 to receive the spear 6 which is secured in the recess by bolts 18.

The shank of spear 6 is substantially rectangular with a vertical surface 19 substantially aligned with the surface of its supporting arm 13 which faces the magazine 3. The forwardmost tip of arm 13 is offset a distance of about .018 inch from surface 19 of spear 6 along an edge 20. The amount of offset between edges 19 and 20 is made to closely correspond with the wall thickness of a seal.

Rearwardly of tip 20, the arm 13 is formed with an inwardly and rearwardly slanted vertical surface 21 to form a recess 22 forwardly of the spear receiving recess 17. The forward tip of spear 6 overlaps recess 22 along a vertical surface 23, the surface 23 being substantially parallel with surface 21 whereby recess 22 is substantially rectangular in shape.

Slide 4 is reciprocally driven to alternately present and withdraw tip 20 of arm 13 and spear 6 adjacent the front of seal supply magazine 3. The flat folded tubular shaped seals are vertically disposed in magazine 3, each resting upon a closed edge. The trough shaped magazine has side walls 24 confining the seals along their slit edges.

The seals are urged to the front of magazine 3 by a vertical pressure plate 25 pivotally depending to within the magazine from a supporting arm 26 carried by table 1. A counterweight 27 is provided for pressure plate 25 to bias it against the rearmost seal of a stack. Magazine 3 may be vibrated to reduce friction whereby the seals are more easily fed forwardly in the magazine.

The forward seal in magazine 3, urged by the pressure of plate 25, has its closed edges pressed against lugs 28 vertically aligned with the forward edges of magazine 3. Lugs 28 are carried by supporting strips which straddle magazine walls 24.

Slide assembly 4 is disposed for alignment of the front tip of spear 6 with the slit edge of the most forwardly disposed seal in magazine 3, when the arm 13 of the slide assembly is biased against stop screw 15 by spring 14. The slit edges of several of the forward seals are exposed to the spear through a recess 29 formed at the front of the wall 24 nearest slide 4.

The forward stroke of slide 4 is of sufficient length to permit the spear 6 to enter between the walls of a seal forcing the outer wall into recess 22 between spear 6 and its supporting arm 13.

The front seal in magazine 3 has its vertical edge farthest from slide 4 retained by vertically spaced lugs 30 extending outwardly from a wall 24 of the magazine forming a forward extension of the wall. Upon entry of spear 6 into the front seal, the seal is retained against spear pressure by lugs 30. The lugs are vertically spaced apart a distance sufficient to avoid interference with the front end of arm 13 which passes therebetween.

Reciprocation of slide assembly 4 is effected by a horizontally disposed gear 31 which drives a vertical shaft 32. Shaft 32 is connected with the rear of slide plate 8 by a crank arm 33 and a link 34 which is pivotally connected between crank 33 and plate 8. As shaft 32 is rotated by gear 31, crank arm 33 acts through link 34 to give reciprocating motion to slide 4.

Gear 31 is driven by a bevel gear 35 carried on the outward end of a drive shaft extension 36 for motor 7. The eccentricity of crank arm 33 relative to gear shaft 32 need not be great as the spear 6 need only travel a short stroke in entering and withdrawing from a seal.

Once spear 6 has entered a seal, it is desirable that the spear and seal be moved outwardly from the forward end of magazine 3 to separate it from the next succeeding seal in the magazine and to provide for ready removal of the seal from the spear. The spear supporting arm, therefore, is given lateral movement away from the magazine after the spear 6 has entered a seal. To insure consistent alignment of each seal with mechanism for removing the same from the spear 6, the outer wall of the speared seal disposed in arm recess 22 is clamped against surface 23 of the spear during lateral separation of the seal and magazine.

Lateral movement of arm 13 results from engagement between a roller 37 carried below the elbow of the L-shaped member and an abutment 38 extending upwardly from table 1 into the path of the roller as it is carried towards magazine 3 by arm 13. Upon engagement between roller 37 and abutment 38, continued forward movement of slide 4 causes arm 13 to pivot outwardly away from stop screw 15 in opposition to the tension of spring 14. The arm 13 is shown outwardly positioned in Fig. 8, the spear 6 having entered a seal and carried the same laterally from the magazine by reason of the lateral movement of the arm.

During lateral movement of arm 13 and spear 6, the seal is clamped in arm recess 22 by U-shaped clamp bracket 39 having a web portion 40 extending through recess 22 and horizontal side portions 41 straddling and outwardly overlapping the arm 13, as best shown in Figs. 5 and 6. The free ends of clamp bracket 39 are pivotally secured to an actuating rod 42 by pivot bolt 43. Actuating rod 42 extends rearwardly from bracket 39 substantially parallel to arm 13 and is pivotally supported on a pin 44 between plates 45 extending from arm 13.

Clamp bracket 39 is biased to clamped position by the action of a compression spring 46 seated in a recess 47 formed in arm 13 and opening into arm recess 22.

Bracket 39 is held in open or unclamped position by the clockwise movement of actuating arm 42 about its supporting pivot pin 44 which draws the bracket towards arm 13 against the pressure of spring 46.

The seal preferably should be clamped against spear 6 just prior to the time that spear 6 begins movement laterally of the magazine as a result of engagement between the roller 37 carried by arm 13 and abutment 38. To retain clamp bracket in unclamped position until just prior to commencement of such lateral movement, the actuating rod 42 for the clamp is held inwardly towards spear carrying arm 13 by a cam plate 48 which extends upwardly from table 1 in a vertical plane substantially parallel to arm 13. Actuating rod 42 rides along cam plate 48 as spear 6 approaches and enters a seal and the plate holds the rod in such a position as to hold clamp 39 in unclamped position against the pressure of spring 46, as shown in Figs. 1, 5, and 7.

Just prior to engagement between roller 37 and abutment 38, the rearward end of rod 42 for clamp 39 reaches the forward end of cam plate 48 and becomes free to swivel outwardly from arm 13 in counterclockwise rotation about pivot 44 for the rod. Such counterclockwise rotation is effected by the spring 46 biasing clamp 39, as shown in Fig. 8.

The seal remains clamped against spear 6 until it has been carried laterally of the magazine by engagement between roller 37 and abutment 38. After lateral movement has occurred, it is desired that the seal be unclamped to permit its removal from spear 6 by transfer mechanism 5. Such unclamping is effected by an abutment 49 on table 1 disposed in the path of clamp actuating rod 42 as arm 13 and spear 6 move away from magazine 3. In Fig. 9 the rod 42 is shown once again rotated clockwise about its pivot 44 to a position substantially parallel to arm 13 wherein clamp 39 is released from the seal.

When the seal has been carried laterally from magazine 3 and clamp 39 has been released from the seal by engagement between rod 42 and abutment 49, the seal is free to be withdrawn from spear 6 by transfer mechanism 5.

Transfer mechanism 5 comprises a hub member 50 fixedly mounted on a vertical shaft 51 to rotate therewith. The shaft 51 extends below table 1 where it carries a sprocket wheel 52. A drive sprocket 53 is similarly carried by the shaft 32 which is rotated by gear 31 for driving slide 4. Drive sprocket 53 is mounted to rotate with gear 31 and in turn drives sprocket 52 through a chain 54 trained about the sprockets 52 and 53. The shaft 51 for transfer mechanism 5 is driven in correlation with the movement of slide 4, both drives being effected through bevel gear 35 which gives corresponding rotation to gear 31 and drive sprocket 53.

The hub 50, rotationally fixed to drive shaft 51 of transfer mechanism 5, carries two pairs of diametrically opposed, radially extending arms 55 which terminate in transfer fingers 56 extending normally of their respective arms 55.

The spear 6 is formed with a forward pointed vertical edge from which the side surface 23 of the spear tapers to provide the seal entering portion of the spear with a horizontal thickness sufficient to cause separation of the seal walls along their entire surfaces including points adjacent the closed edges of the seal. The spear is further formed with a vertical thickness less than the length of the slit edge of the seal whereby spaces remain both above and below the spear between separated seal walls when wedging action by the spear has occurred.

In Fig. 6, a space 58 is shown above spear 6 as a result of partial opening of a seal by the spear. By centering the spear vertically of the closed seal edges, a similar space exists below the spear. For removal of the seal from spear 6, the transfer mechanism 5 is disposed to present the forward tips of transfer fingers 56 in rotary paths aligned with the corresponding spaces 58 whereby fingers 56 straddle spear 6 to enter and remove the seal.

A seal supported by transfer fingers 56 may be carried thereby to a station in the path of the fingers 56 where it is transferred to loading fingers or otherwise handled in successive bottle sealing steps.

When the seal has been removed from spear 6, rearward movement of slide 4 returns the machine elements to their original positions, at which time the cycle of operation is repeated. The rear tip of clamp actuating rod 42 is formed to a point to permit is to slide upon cam plate 48 when moved rearwardly.

Transfer fingers 56 on opposite pairs of supporting arms 55 alternate in picking seals from the spear 6. To cause transfer mechanism 5 to rotate only one for each two cycles of operation of the slide assembly 4, the sprocket 52 carried by the shaft 51 of the transfer mechanism is twice the diameter of drive sprocket 53 associated with gear 31 for driving the slide 4.

The described mechanism has been found in operation to be highly effective in stripping, partially opening, and transferring seals. Consistent alignment of a seal with the spear 6 both while in the magazine and while on the spear has resulted. The mechanism may be successfully operated at high speeds, and increased speed and efficiency in performance of the described elements have reduced the time consumed by other mechanism cooperating therewith. Overall complexity of a bottle sealing machine is reduced in that the simple spear mechanism of the present invention performs stripping, partial opening, and transfer functions previously performed by a plurality of implements.

The invention is unique in the fact that a seal may be placed on transfer fingers when removed to within an extremely short distance from its supply magazine. Also, partial opening occurs while the seal is still in the magazine and no special opening station is required.

By opening a seal by means of an elongated, internally received member, the seal is formed to a shape approaching its final tubular form rather than being distorted to a shape quite different therefrom.

The described spearing means does not depend on any particular angular disposition. The magazine may be disposed to best cooperate in the movement of the seal in directions and planes suited to other transfer mechanism.

Various embodiments of the invention may be employed within the scope of the following claims.

I claim:

1. In a machine for applying tubular seals to bottle tops and the like, a device for partially opening and transferring said seals comprising, means for supporting a seal in flat folded condition with the corresponding adjacent end edges thereof being in a common plane and having a closed slit therebetween, a tool of substantially spear shape having a forward pointed edge of a length less than the length of the slit between the corresponding adjacent edges of the folded seal, means supporting said tool with the pointed edge thereof substantially in the plane of the folded seal and with said pointed edge facing and aligned with the slit between the seal edges, means to move said tool supporting means towards said seal whereby the tool enters the closed slit edge of the seal and effects separation of seal walls, clamp means for retaining a seal upon said tool for movement therewith after entry of the tool between seal walls, and means to actuate said clamp in correlation to the movement of said tool.

2. In a machine for applying tubular seals to bottle tops and the like, a device for partially opening and transferring said seals comprising, means for supporting a seal in flat folded condition with the corresponding adjacent end edges thereof being in a common plane and having a closed slit therebetween, a tool of substantially spear shape having a forward pointed edge of a length less than the length of the slit between the corresponding adjacent edges of the folded seal, means supporting said tool with the pointed edge thereof substantially in the plane of the folded seal and with said pointed edge facing and aligned with the slit between the seal edges, means to move said tool supporting means towards said seal whereby the tool enters the slit edge of the seal and effects separation of seal walls, and transfer means for engaging a seal supported and partially opened by said tool to remove the seal from the tool.

3. In a machine for applying tubular seals to bottle tops and the like, a device for transferring said seals comprising, means for supporting a folded seal with a closed slit edge portion thereof exposed, a tool having a forward end formed with a dimension less than the length of the slit edge of the seal, means for carrying said tool with the forward end thereof disposed for entry between the walls of the seal supported by said first named means to enter centrally of the slit edge of the seal, and a pair of transfer fingers supported for movement in parallel paths respectively aligned with a space between said tool and a folded edge of the seal after entry of the tool between the seal walls, said fingers being adapted to enter the seal and remove the same from the tool in a continuous forward movement.

4. In a machine for applying tubular seals to bottle tops and the like, a device for transferring said seals comprising, means for supporting a folded seal with a closed slit edge portion thereof exposed, a tool having a forward end formed with a dimension less than the length of the slit edge of the seal, means for carrying said tool with the forward end thereof disposed for entry between the wall of the seal supported by said first named means to enter centrally of the slit edge of the seal, means for retaining the seal upon said tool for movement therewith after entry of the tool between the seal walls, and a pair of transfer fingers supported for movement in parallel paths respectively aligned with a space between said tool and a folded edge of the seal as the seal is supported on said tool, said fingers being adapted to enter the seal and remove the same from the tool in a continuous forward movement.

5. In a machine for applying tubular seals to bottle tops and the like, a device for transferring said seals comprising, means for supporting a folded seal with a closed slit edge portion thereof exposed, a tool having a forward end formed with a dimension less than the length of the slit edge of the seal, means for carrying said tool with the forward end thereof disposed for entry between the walls of the seal supported by said first named means to enter centrally of the closed slit edge of the seal, and a clamp carried by said last named means adjacent said tool and disposed to hold one wall of the seal in engagement with the tool after entry of the tool between the walls of the seal to thereafter effect movement of the seal with the tool.

6. In a machine for applying tubular seals to bottle tops and the like, a device for transferring said seals comprising, means for supporting a seal with a slit portion thereof exposed, a tool having a forward end formed with a dimension less than the length of the slit edge of a seal, means for carrying said tool with the forward end thereof disposed for entry between the walls of a seal supported by said first named means to enter centrally of the slit edge of the seal, a clamp carried with said tool and disposed to hold one wall of the seal in engagement with the tool after entry of the tool between the walls of the seal, transfer means for engaging a seal carried by said tool to remove the seal from the tool, and means to operate said clamp in correlation with the operation of said tool and transfer means for releasing the clamp upon engagement between the transfer means and a seal.

7. In a machine for applying tubular seals to bottle tops and the like, a device for transferring said seals comprising, means for supporting a seal with a slit portion thereof exposed, a tool having a foward end formed with a dimension less than the length of the slit edge of a seal, means for carrying said tool with the forward end thereof disposed for entry between the walls of a seal supported by said first named means to enter centrally of the slit edge of the seal, a clamp carried with said tool and disposed to hold one wall of the seal in engagement with the tool after entry of the tool between the walls of the seal, at least one transfer finger supported for movement in a path aligned with a space between said tool and a folded edge of a seal clamped thereto, said finger being adapted to remove the seal from the tool, and means to operate said clamp in correlation with the operation of said tool and transfer finger for releasing the clamp just prior to removal of the seal from the tool by the finger.

8. In a machine for applying tubular seals to bottle tops and the like, a device for partially opening said seals comprising, means for supporting a seal in flat folded condition with the corresponding adjacent end edges thereof being in a common plane and having a closed slit therebetween, a tool of substantially spear shape, means for moving said tool with the forward end thereof substantially in the plane of a folded seal supported by said first named means whereby the tool enters said slit edge of the seal and effects separation of walls of the seal, means to clamp the seal upon said tool, and means for moving the tool with the seal clamped thereon to transfer the seal from said seal supporting means.

9. In a machine for applying tubular seals to bottle tops and the like, a device for partially opening and transferring seals comprising, a magazine for supporting a stack of seals in flat folded condition with the corresponding adjacent end edges of each being in a common plane and having a closed slit therebetween, a tool of substantially spear shape having a forward pointed end, means for moving said tool with the forward end thereof substantially in the plane of the end folded seal in said magazine whereby the tool pierces a slit edge of the seal and effects separation of the walls of the seal, means to clamp the pierced seal upon said tool, and means for moving the tool and the seal clamped thereon laterally of the said plane from the magazine after partial opening of the seal by the tool.

10. In a machine for applying tubular seals to bottle tops and the like, a device for partially opening said seals comprising, a magazine for supporting a stack of seals in flat folded condition with each seal supported upon one of its folded edges and with the corresponding adjacent end edges of each being in a common plane and having a closed slit therebetween, a tool of substantially spear shape having a forward pointed edge of a length less than the length of a slit edge of a folded seal, means for reciprocating said tool with the said pointed edge thereof substantially in the plane of the end folded seal contained in said magazine whereby said tool enters the closed slit edge of the seal and effects separation of the seal walls, means to clamp the seal upon said tool to effect removal of the seal with the tool from the magazine, and means unclamping and for removing a partially opened seal from said tool after removal of the seal from the magazine.

11. In a device of the class described, a rectangular magazine for containing folded flat seals and having horizontal and vertical walls with a substantially open discharge end, means extending inwardly from a horizontal wall of said magazine to serve as a stop for the end seal, means to bias the seals in said magazine toward said open end and against said stop means, said seals being adapted to be supported upon corresponding folded edges with the closed end edges thereof engaging the corresponding vertical side walls of the magazine, at least one side wall of said magazine having a central recess therein to expose the closed slit between adjacent edges of the end seal, spear means disposed to enter the exposed slit between the end edges of the end seal in said magazine and to spread the walls of said seal apart, and means to move said spear means to effect entry of the end seal of the magazine and thereafter removal of the seal outwardly from the open discharge end of the magazine, the spreading of the walls of the seal tending to contract the seal vertically and to facilitate release of the same from said stop.

References Cited in the file of this patent

UNITED STATES PATENTS

| 762,800 | Bowden | June 14, 1904 |
| 2,036,105 | Strout | Mar. 31, 1936 |
| 2,089,769 | Strout | Aug. 10, 1937 |
| 2,103,302 | Strout | Dec. 28, 1937 |
| 2,579,458 | Allen et al. | Dec. 25, 1951 |
| 2,601,480 | Williams | June 24, 1952 |

FOREIGN PATENTS

| 420,039 | Great Britain | Nov. 23, 1934 |
| 628,262 | Germany | Mar. 31, 1936 |
| 509,597 | Great Britain | July 18, 1939 |